(12) United States Patent
Gu et al.

(10) Patent No.: US 12,174,337 B1
(45) Date of Patent: Dec. 24, 2024

(54) INTENSIFICATION MECHANISM ANALYSIS AND ANTHROPOGENIC CLIMATE CHANGE SIGNAL IDENTIFICATION METHOD FOR TERRESTRIAL WATER CYCLE (TWC) IN DRY AND WET REGIONS

(71) Applicant: CHINA UNIVERSITY OF GEOSCIENCES (WUHAN), Wuhan (CN)

(72) Inventors: Xihui Gu, Wuhan (CN); Yansong Guan, Wuhan (CN); Lunche Wang, Wuhan (CN); Xiang Zhang, Wuhan (CN); Yanhui Zheng, Wuhan (CN); Jie Gong, Wuhan (CN); Dongdong Kong, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 0 days.

(21) Appl. No.: 18/646,784

(22) Filed: Apr. 26, 2024

(30) Foreign Application Priority Data

Oct. 12, 2023  (CN) .......................... 202311322564.2

(51) Int. Cl.
 *G01W 1/06* (2006.01)
 *G01W 1/14* (2006.01)

(52) U.S. Cl.
 CPC .............. *G01W 1/06* (2013.01); *G01W 1/14* (2013.01); *G01W 2201/00* (2013.01)

(58) Field of Classification Search
 CPC ...... G01W 1/06; G01W 1/14; G01W 2201/00
 See application file for complete search history.

(56) References Cited

U.S. PATENT DOCUMENTS 10,989,839 B1  4/2021  Matthews et al.
11,810,209 B2  11/2023  Tiwari et al.
11,854,383 B2  12/2023  Nakhjavani et al.
(Continued)

OTHER PUBLICATIONS

Chambers et al., Phenological Changes in the Southern Hemisphere, Oct. 1, 2013, PLOS ONE 8(10): e75514. https://doi.org/10.1371/journal.pone.0075514 (Year: 2013).*

(Continued)

*Primary Examiner* — Mi'schita' Henson
(74) *Attorney, Agent, or Firm* — True Shepherd LLC; Andrew C. Cheng

(57) ABSTRACT

An intensification mechanism analysis and anthropogenic climate change signal identification method for terrestrial water cycle (TWC) in dry and wet regions, includes: identifying dry regions and wet regions worldwide with observed data; quantifying a precipitation increasing rate; calculating a regional warming rate and a precipitation response warming rate, and investigating a difference between dry regions and wet regions; identifying a fingerprint pattern of a precipitation increase in dry regions and wet regions in response to global warming, and calculating a signal-to-noise ratio (SNR) to quantify a possibility of an anthropogenic climate change signal in dry regions and wet regions; and detecting different external forcing signals in a precipitation change of dry regions and wet regions with an optimal fingerprinting method, and quantifying a contribution of each of the different external forcing signals to the precipitation change.

9 Claims, 10 Drawing Sheets

(56) References Cited

U.S. PATENT DOCUMENTS

2016/0003976 A1* 1/2016 Luvalle .................. G01W 1/14
702/3
2017/0176640 A1* 6/2017 Kodra .................... G01W 1/06

OTHER PUBLICATIONS

Kaufman et al., Earth Observing System AM1 Mission to Earth, Jul. 1998, IEEE Transactions on Geoscience and Remote Sensing, vol. 36, No. 4, pp. 1045-1055 (Year: 1998).*

Guan et al., Human-induced intensification of terrestrial water cycle in dry regions of the globe, 2024, npj Climate and Atmospheric Science, 7:45, pp. 1-13 (Year: 2024).*

* cited by examiner

INTENSIFICATION MECHANISM ANALYSIS AND ANTHROPOGENIC CLIMATE CHANGE SIGNAL IDENTIFICATION METHOD FOR TERRESTRIAL WATER CYCLE (TWC) IN DRY AND WET REGIONS

CROSS-REFERENCE TO RELATED APPLICATIONS

This application claims priority to Chinese Patent Application No. 202311322564.2 with a filing date of Oct. 12, 2023. The content of the aforementioned application, including any intervening amendments thereto, is incorporated herein by reference.

TECHNICAL FIELD

The present disclosure relates to the field of carbon neutralization, and in particular to an intensification mechanism analysis and anthropogenic climate change signal identification method for a terrestrial water cycle (TWC) in dry and wet regions.

BACKGROUND

The terrestrial water cycle (TWC) is an essential component of the climate system, and directly impacts water resources, agricultures, and ecosystems worldwide. As a widely concern, global warming has contributed to intensification of the TWC, mainly the increase in global annual total precipitation (PRCPTOT). However, temporal trends in terrestrial annual PRCPTOT exhibit considerable spatial heterogeneity, with different climatic regions showing dissimilar trends. Understanding the divergent responses (e.g., PRCPTOT changes) of the TWC to global warming in dry and wet regions is essential for infrastructure planning, water resource management, and sustainable development.

SUMMARY OF PRESENT INVENTION

In order to investigate a relationship between change in TWC and global warming, the present disclosure provides an intensification mechanism analysis and anthropogenic climate change signal identification method for change in TWC in dry and wet regions, including the following steps:
S1, acquiring climatic data, the climatic data including global gridded precipitation observation data, and simulation data from coupled model intercomparison project phase 6 (CMIP6) simulations, and the simulated data including precipitation data, near-surface air temperature data, meridional wind velocity data, zonal wind velocity data, specific humidity data and surface air pressure data;
S2, calculating annual PRCPTOTs across a global land surface according to the precipitation observation data, calculating an average annual PRCPTOT during a climatological period, and selecting top a % of grid cells as wet regions, and bottom a % of grid cells as dry regions, a being a preset value;
S3, calculating an annual PRCPTOT in dry regions and an annual PRCPTOT in wet regions according to the precipitation observation data, the grid cells in wet regions and the grid cells in dry regions; and calculating an average annual PRCPTOT in dry regions and wet regions during the climatological period, performing normalization and regional averaging to obtain a normalized annual PRCPTOT, and quantifying a temporal trend of the normalized annual PRCPTOT in dry regions and wet regions to obtain a precipitation increasing rate in dry regions and wet regions;
S4, calculating, according to the precipitation data and the near-surface air temperature data based on CMIP6 simulations, a weighted-area-averaged annual air temperature anomaly in dry regions and a weighted-area-averaged annual air temperature anomaly in wet regions, and quantifying a temporal trend of the air temperature anomaly in dry regions and wet regions to obtain a regional warming rate in dry regions and wet regions; and comparing the precipitation increasing rate in dry regions and wet regions obtained in the step S3 with the regional warming rate in dry regions and wet regions to obtain a precipitation response warming rate in dry regions and wet regions;
S5, calculating, according to the simulated data based on CMIP6 simulations, a weighted-area-averaged normalized vertically integrated water vapor (VIWV) and a weighted-area-averaged normalized vertically integrated water vapor transport (IWVT) in dry regions and wet regions in a historical period and a future period, and calculating a projected change of the future period compared with the historical period to obtain a VIWV increasing rate and an IWVT increasing rate in dry regions and wet regions in response to global warming;
S6, performing, in combination with the normalized annual PRCPTOT in the step S3, rotated empirical orthogonal function (REOF) decomposition on three-dimensional (3D) spatio-temporal data of the annual PRCPTOT for the grid cells of dry regions and 3D spatio-temporal data of the annual PRCPTOT for the grid cells of wet regions to obtain a fingerprint pattern, projecting the fingerprint pattern to an observed and simulated annual PRCPTOT of dry regions and wet regions, and quantifying a signal-to-noise ratio (SNR) to calculate a significance of an anthropogenic climate change signal in dry regions and wet regions; and
S7, performing, in combination with the precipitation data based on CMIP6 simulations obtained in the step S1, detection and attribution on an external forcing with a single-signal optimal fingerprinting method and a two-signal optimal fingerprinting method.

The present disclosure provides a storage device, where the storage device stores an instruction and data for realizing the intensification mechanism analysis and anthropogenic climate change signal identification method for TWC in dry and wet regions.

The present disclosure provides an intensification mechanism analysis and anthropogenic climate change signal identification device for TWC in dry and wet regions, including a processor and a storage device, where the processor loads and executes an instruction and data in the storage device to realize the intensification mechanism analysis and anthropogenic climate change signal identification method for TWC in dry and wet regions.

The present disclosure has the following beneficial effects:
(1) The present disclosure provides a method for identifying dry regions and wet regions. This facilitates in-depth understanding of academic circles on different climate regions. The present quantifies the precipitation increasing rate in dry regions and wet regions based on observed and simulated data under different climate forcing and estimates different greenhouse-gas emission scenarios, thereby providing a scientific basis for disaster control policies and measures in dry and wet regions.

(2) The present disclosure quantifies the regional warming rate in dry regions and wet regions, and clarifies a sensitivity of precipitation to regional warming in dry and wet regions. By analyzing water vapor conditions in dry regions and wet regions, the present disclosure clarifies different warming responses of the dry and wet regions to the global warming from the VIWV and the IWVT. This provides a theoretical support for decision makers to formulate climate change countermeasures for the TWC in dry and wet regions.

(3) The present disclosure quantitatively detects an observed precipitation change in dry regions and wet regions, identifies impacts of anthropogenic climate change (ACC) on the precipitation in dry and wet regions under different external forcings, and quantifies contributions of different external forcings to the precipitation change, thereby providing a theoretical support for attribution of the TWC worldwide.

DETAILED DESCRIPTION OF THE EMBODIMENTS

In order to make the objective, technical solution and advantages of the present disclosure clearer, embodiments of the present disclosure will be further described in detail in conjunction with the accompanying drawings.

Figure 1:
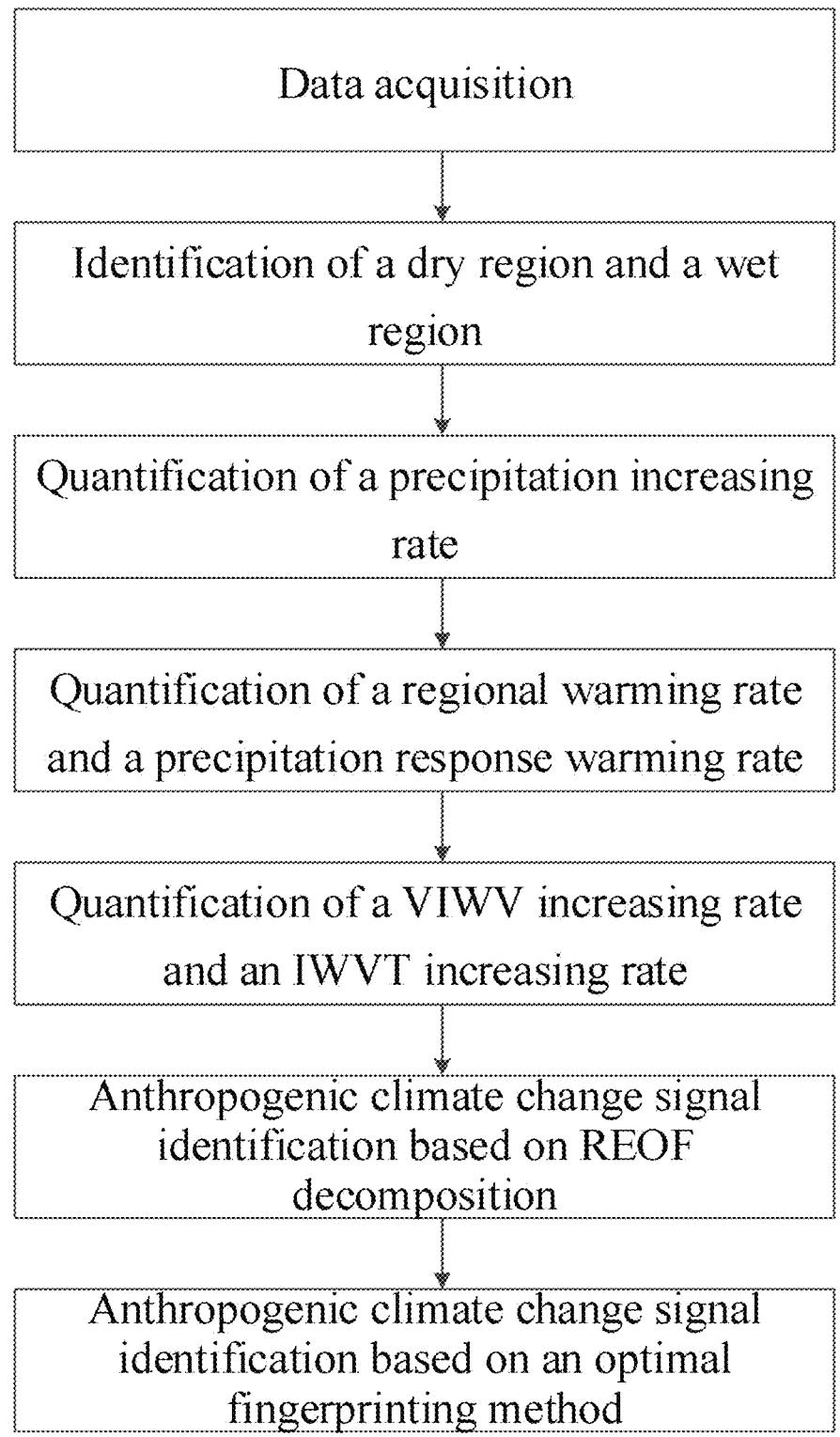
FIG. 1 is a flowchart of an intensification mechanism analysis and anthropogenic climate change signal identification method for TWC in dry and wet regions.

Referring to FIG. 1, FIG. 1 schematically illustrates a system of the present disclosure.

The present disclosure provides an intensification mechanism analysis and anthropogenic climate change signal identification method for TWC in dry and wet regions, including the following steps:

In S1, climatic data is acquired. The climatic data includes global gridded precipitation observation data, and simulated data in CMIP6 simulations. The simulated data includes precipitation data, near-surface air temperature data, meridional wind velocity data, zonal wind velocity data, specific humidity data, and surface air pressure data.

In the step S1, the global gridded precipitation observation data or the precipitation data in CMIP6 simulations is obtained by ensemble averaging on multiple sets or pieces of precipitation data in different models.

In S2, annual PRCPTOTs across a global land surface are calculated according to the precipitation observation data. An average annual PRCPTOT during a climatological period is calculated. Top a % of grid cells are selected as wet regions, and bottom a % of grid cells are selected as dry regions. a is a preset value.

In the step S2, the annual PRCPTOTs are calculated with a monthly precipitation or a daily precipitation. The average annual PRCPTOT is calculated according to the climatological period. Average annual PRCPTOTs during the climatological period across grid cells of the global land surface are sorted. Top 30% of grid cells are selected as wet regions. Bottom 30% of grid cells are selected as dry regions.

In S3, an annual PRCPTOT in dry regions and an annual PRCPTOT in wet regions are calculated according to the precipitation observation data, the grid cells in wet regions and the grid cells in dry regions. An average annual PRCPTOT in dry regions and wet regions during the climatological period is calculated. Normalization and regional averaging are performed to obtain a normalized annual PRCPTOT. A temporal trend of the normalized annual PRCPTOT in dry regions and wet regions is quantified to obtain a precipitation increasing rate in dry regions and wet regions.

The step S3 specifically includes:

In S31, multiple sets of observed precipitation data are selected from different models under different scenarios from CMIP6, including a historical climate forcing (ALL), a greenhouse-gas forcing (GHG), an anthropogenic-aerosol forcing (AER), a natural forcing (NAT) and four future different SSP scenarios.

In S32, the average annual PRCPTOT during the climatological period is calculated. A ratio of a difference between annual PRCPTOT and average annual PRCPTOT to the average annual PRCPTOT is calculated to obtain the normalized annual PRCPTOT. Area-weighted averaging is performed on the normalized annual PRCPTOT and the corresponding grid cells of dry regions and wet regions to obtain a weighted-area-averaged normalized annual PRCPTOT in dry regions and wet regions. The temporal trend of the normalized annual PRCPTOT in dry regions and wet regions is quantified to obtain the precipitation increasing rate in dry regions and wet regions.

In S4, according to the precipitation observation data and the near-surface air temperature data in CMIP6 simulations, a weighted-area-averaged annual air temperature anomaly in dry regions and a weighted-area-averaged annual air temperature anomaly in wet regions are calculated. A temporal trend of the air temperature anomaly in dry regions and wet regions is quantified to obtain a regional warming rate in dry regions and wet regions. The precipitation increasing rate in dry regions and wet regions obtained in the step S3 is compared with the regional warming rate in dry regions and wet regions to obtain a precipitation response warming rate in dry regions and wet regions.

The step S4 specifically includes:

In S41, the near-surface air temperature data is selected from different scenarios in CMIP6 simulations, including an ALL, a GHG, an AER, a NAT and four future different SSP scenarios.

In S42, an annual air temperature in dry regions and an annual air temperature in wet regions are calculated. A climatological annual air temperature is calculated. A difference between the annual air temperature and the climatological annual air temperature is quantified to obtain the annual air temperature anomalies. Weighted averaging is performed on the annual air temperature anomalies and the corresponding grid cells of dry regions and wet regions to obtain a regionally averaged annual air temperature anomaly in dry regions and wet regions. A trend is quantified to obtain a regional warming trend in dry regions and wet regions. The precipitation increasing rate is compared with the regional warming rate to obtain the precipitation response warming rate in dry regions and wet regions.

In S5, according to the simulated data in CMIP6 simulations, a weighted-area-averaged normalized VIWV and a weighted-area-averaged normalized IWVT in dry regions and wet regions in a historical period and a future period are calculated. A projected change of the future period compared with the historical period is calculated to obtain a VIWV increasing rate and an IWVT increasing rate in dry regions and wet regions in response to global warming;

The step S5 specifically includes:

In S51, data from an ALL and future different SSP scenarios based on CMIP6 is selected. The VIWV, the IWVT and a globally averaged annual air temperature are calculated. The VIWV and the IWVT are respectively calculated by:

$$VIWV = \frac{1}{\rho g} \int_{p_t}^{p_s} q \, dp$$

$$IWVT = \frac{1}{\rho g} \int_{p_t}^{p_s} \sqrt{(uq)^2 + (vq)^2} \, dp$$

In the foregoing Eq., $\rho$ represents a water density, g represents a gravitational acceleration, $p_t$ represents a pressure at a top of an atmosphere, $p_s$ represents a near-surface pressure, q represents a specific humidity, v represents a meridional wind, and u represents a zonal wind.

In S52, the VIWV and the IWVT are normalized same as the PRCPTOT. In combination with the globally averaged annual air temperature, a VIWV and an IWVT of dry regions and wet regions in the historical period and at an end of a twenty-first century in response to global warming are calculated.

In S6, in combination with the normalized annual PRCPTOT in the step S3, REOF decomposition is performed on 3D spatio-temporal data of the annual PRCPTOT for the grid cells of dry regions and 3D spatio-temporal data of the annual PRCPTOT for the grid cells of wet regions to obtain a fingerprint pattern. The fingerprint pattern is projected to an observed and simulated annual PRCPTOT of dry regions and wet regions. A SNR is quantified to calculate a significance of an anthropogenic climate change signal in dry regions and wet regions.

The step S6 specifically includes:

In S61, 3D spatio-temporal data of the normalized annual PRCPTOT in dry regions and wet regions is selected from an ALL and future different SSP scenarios in the CMIP6. The REOF decomposition is performed to obtain a spatial fingerprint pattern of a leading mode. The spatial fingerprint pattern is projected to an observed annual PRCPTOT and a pre-industrial simulated annual PRCPTOT in dry regions and wet regions, with a projection being calculated by $$\text{Projection}(t) = \frac{\sum_{i \in lon_S, j \in lat_S} F(i,j) A(i,j) PRCP(i,j,t)}{\sum_{i \in lon_S, j \in lat_S} A(i,j)}$$

In the foregoing Eq., t represents a year, i represents a longitude of each of the grid cell, j represents a latitude of the grid cell, A represents an area of the grid cell, S represents dry regions or wet regions, PRCP represents the annual PRCPTOT, F represents the spatial fingerprint pattern, and $lon_s$ and $lat_s$ respectively represent a longitude set and a latitude set.

In S62, a trend is calculated with the projection. The SNR is calculated with an l-year trend projected by observed data and CMIP6 historical simulated annual PRCPTOT in dry regions and wet regions as a signal, and a standard deviation of an l-year trend projected by the CMIP6 pre-industrial simulated annual PRCPTOT as a noise. The significance of the signal is divided according to the SNR. l is a preset value.

In S63, from a m-year length to a n-year length, projection trends for the CMIP6 historical simulated annual PRCPTOT and the CMIP6 pre-industrial simulated annual PRCPTOT in dry regions and wet regions are calculated. Time of emergence of the anthropogenic climate change signal is calculated according to the SNR. A robustness of the anthropogenic climate change signal in an observed precipitation of dry regions and wet regions is validated according to a model result. m and n are a preset value.

In S7, in combination with the precipitation data of the CMIP6 simulations obtained in the step S1, detection and attribution are performed on an external forcing with a single-signal optimal fingerprinting method and a two-signal optimal fingerprinting method.

The optimal fingerprinting method in the step S7 is given by:

$$y = (X - \alpha)\beta + \in$$

In the foregoing Eq., y represents an observed annual PRCPTOT time series of dry regions and wet regions, X represents a simulated annual PRCPTOT time series of dry regions and wet regions, including an ALL, a GHG, an AER and a NAT, $\beta$ represents a scaling factor, and $\in$ represents a regression residual. The external forcing attributed by an observed change of the annual PRCPTOT in dry regions and wet regions is quantified as:

$$\text{Con} = \text{Slope} \times \beta$$

In the foregoing Eq., slope represents a simulated linear trend for the annual PRCPTOT in dry regions and wet regions under each external forcing.

The present disclosure is further described with an implementation example. The implementation example is used to illustrate the present disclosure, rather than to limit an application scope of the present disclosure. The present disclosure is also applied to other regions and other time periods.

FIG. 1 is a flowchart of an intensification mechanism analysis and anthropogenic climate change signal identification method for TWC in dry and wet regions. Specifically:

(1) Acquisition of Simulated Data

In the implementation example, observed precipitation data from three sources is acquired, as shown in Table 1.

TABLE 1

Observed precipitation datasets

| Dataset | Number of stations | Spatial resolution | Temporal resolution |
|---|---|---|---|
| HADEX3 | 17778 | 1.875° × 1.25° | Monthly, 1901-2018 |
| CRU-TS 4.05 | 11800 | 0.5° × 0.5° | Monthly, 1901-2020 |
| GPCC | 67298 | 0.25° × 0.25° | Monthly, 1891-2019 |

Data from the CMIP6 is also acquired. The historical simulations are as shown in Table 2 below.

TABLE 2

Selected models in historical simulations from the CMIP6

| Model name | ALL | NAT Ensembles | GHG | AER | Pre-industrial simulation Years |
|---|---|---|---|---|---|
| ACCESS-CM2 | 5 | 2 | 3 | 3 | 500 |
| ACCESS-ESM1-5 | 40 | 2 | 3 | 3 | 900 |
| AWI-CM-1-1-MR | 1 | — | — | — | 500 |
| AWI-ESM-1-1-LR | — | — | — | — | 100 |
| BCC-CSM2-MR | 1 | 3 | 3 | 3 | 600 |
| BCC-ESM1 | — | — | — | — | 451 |
| CAMS-CSM1-0 | — | — | — | — | 500 |
| CanESM5 | 50 | 50 | 50 | 30 | 2051 |
| CanESM5-CanOE | — | — | — | — | 501 |
| CAS-ESM2-0 | 1 | — | — | — | 549 |
| CESM2 | 4 | — | — | — | 1200 |
| CESM2-FV2 | — | — | — | — | 500 |
| CESM2-WACCM | 3 | — | — | — | 449 |
| CESM2-WACCM-FV2 | — | — | — | — | 500 |
| CIESM | 1 | — | — | — | 500 |
| CMCC-CM2-SR5 | 1 | — | — | — | 500 |
| CMCC-ESM2 | 1 | — | — | — | 500 |
| CNRM-CM6-1 | 6 | 10 | 10 | 10 | 500 |
| CNRM-CM6-1-HR | 1 | — | — | — | 300 |
| CNRM-ESM2-1 | 9 | — | — | — | 500 |
| E3SM-1-0 | — | — | — | — | 500 |
| E3SM-1-1 | — | — | — | — | 251 |
| E3SM-1-1-ECA | — | — | — | — | 251 |
| EC-Earth3 | 1 | — | — | — | 1501 |
| EC-Earth3-CC | 1 | — | — | — | 29 |
| EC-Earth3-LR | — | — | — | — | 201 |
| EC-Earth3-Veg | 5 | — | — | — | 500 |
| EC-Earth3-Veg-LR | 3 | — | — | — | 501 |
| FGOALS-f3-L | 1 | — | — | — | 561 |
| FGOALS-g3 | 1 | 3 | 1 | 2 | 700 |
| FIO-ESM-2-0 | 1 | — | — | — | 0 |
| GFDL-CM4 | — | 3 | — | — | 0 |
| GFDL-ESM4 | 3 | 3 | 1 | 1 | 0 |
| GISS-E2-1-G | 19 | — | — | — | 2278 |
| GISS-E2-1-H | 10 | — | — | — | 1102 |
| GISS-E2-2-G | — | — | — | — | 151 |
| GISS-E2-2-H | — | — | — | — | 251 |
| HadGEM3-GC31-LL | 5 | 10 | 5 | 5 | 500 |
| HadGEM3-GC31-MM | — | — | — | — | 500 |
| IITM-ESM | — | — | — | — | 200 |
| INM-CM4-8 | 1 | — | — | — | 531 |
| INM-CM5-0 | 1 | — | — | — | 1201 |
| IPSL-CM5A2-INCA | — | — | — | — | 250 |
| IPSL-CM6A-LR | 11 | 10 | 10 | 10 | 2000 |
| KACE-1-0-G | 3 | — | — | — | 450 |
| KIOST-ESM | 1 | — | — | — | 0 |
| MCM-UA-1-0 | 1 | — | — | — | 500 |
| MIROC-ES2L | 30 | — | — | — | 500 |
| MIROC6 | 33 | 50 | 3 | 10 | 800 |
| MPI-ESM-1-2-HAM | — | — | — | — | 780 |
| MPI-ESM1-2-HR | 2 | — | — | — | 500 |
| MPI-ESM1-2-LR | 29 | — | — | — | 1100 |
| MRI-ESM2-0 | 5 | 5 | 5 | 5 | 952 |
| NESM3 | 1 | — | — | — | 500 |
| NorCPM1 | — | — | — | — | 400 |
| NorESM1-F | — | — | — | — | 200 |
| NorESM2-LM | 1 | 3 | 3 | 3 | 501 |
| NorESM2-MM | 1 | — | — | — | 500 |

TABLE 2-continued

Selected models in historical simulations from the CMIP6

| Model name | ALL | NAT Ensembles | GHG | AER | Pre-industrial simulation Years |
|---|---|---|---|---|---|
| SAM0-UNICON | — | — | — | — | 90 |
| TaiESM1 | 1 | — | — | — | 500 |
| UKESM1-0-LL | 14 | — | — | — | 1880 |
| Total | 309 | 154 | 97 | 85 | 36213 |

Note:
"—" indicates that there is no model in the test.

Future simulations from the CMIP6 are as shown by data in Table 3.

TABLE 3

Selected models in future different SSP scenarios from the CMIP6

| | SSP126 | SSP245 | SSP370 | SSP585 |
|---|---|---|---|---|
| ACCESS-CM2 | 5 | 5 | 5 | 5 |
| ACCESS-ESM1-5 | 40 | 40 | 40 | 40 |
| AWI-CM-1-1-MR | 1 | 1 | 5 | 1 |
| BCC-CSM2-MR | 1 | 1 | 1 | 1 |
| CanESM5 | 50 | 50 | 50 | 50 |
| CanESM5-CanOE | 3 | — | 3 | 3 |
| CAS-ESM2-0 | 2 | 1 | 1 | 2 |
| CESM2 | 4 | 4 | 4 | 3 |
| CESM2-WACCM | 1 | 3 | 1 | 3 |
| CIESM | 1 | 1 | — | 1 |
| CMCC-CM2-SR5 | 1 | 1 | 1 | 1 |
| CMCC-ESM2 | 1 | 1 | 1 | 1 |
| CNRM-CM6-1 | — | 6 | — | — |
| CNRM-CM6-1-HR | — | 1 | — | — |
| CNRM-ESM2-1 | — | 9 | — | — |
| E3SM-1-1 | — | — | — | 1 |
| EC-Earth3 | 1 | 1 | 1 | 1 |
| EC-Earth3-CC | — | 1 | — | 1 |
| EC-Earth3-Veg | 1 | 5 | 1 | 1 |
| EC-Earth3-Veg-LR | 3 | 3 | 3 | 3 |
| FGOALS-f3-L | 1 | 1 | 1 | 1 |
| FGOALS-g3 | 1 | 1 | 1 | 1 |
| FIO-ESM-2-0 | 1 | 1 | — | 1 |
| GFDL-ESM4 | 1 | 3 | 1 | 1 |
| GISS-E2-1-G | 11 | 19 | 23 | 11 |
| GISS-E2-1-H | 5 | 10 | 6 | 5 |
| HadGEM3-GC31-LL | — | 5 | — | 4 |
| HadGEM3-GC31-MM | 1 | — | — | 4 |
| IITM-ESM | 1 | — | 1 | — |
| INM-CM4-8 | 1 | 1 | 1 | 1 |
| INM-CM5-0 | 1 | 1 | 1 | 1 |
| IPSL-CM5A2-INCA | 1 | — | 1 | — |
| IPSL-CM6A-LR | 1 | 11 | 1 | 1 |
| KACE-1-0-G | 3 | 3 | 3 | 3 |
| KIOST-ESM | — | 1 | — | — |
| MCM-UA-1-0 | 1 | 1 | 1 | 1 |
| MIROC-ES2L | 10 | 30 | 10 | 10 |
| MIROC6 | 50 | 33 | 3 | 46 |
| MPI-ESM1-2-HR | 1 | 2 | 10 | 1 |
| MPI-ESM1-2-LR | 7 | 29 | 7 | 9 |
| MRI-ESM2-0 | 5 | 5 | 4 | 5 |
| NESM3 | 1 | 1 | — | 1 |
| NorESM2-LM | 1 | 1 | 1 | 1 |
| NorESM2-MM | 1 | 1 | 1 | 1 |
| TaiESM1 | 1 | 1 | 1 | 1 |
| UKESM1-0-LL | 13 | 14 | 13 | 5 |
| Total | 235 | 309 | 208 | 233 |

In the example, 309 pieces of simulated data are acquired from the CMIP6 in total. A precipitation, a near-surface air temperature, a meridional wind velocity, a zonal wind velocity, a specific humidity, and a surface air pressure serve as variables. Meteorological data is interpolated with a bilinear interpolation method, with a spatial resolution of 2.5°×2.5°. (2) Identification of dry regions and wet regions.

Figure 2:
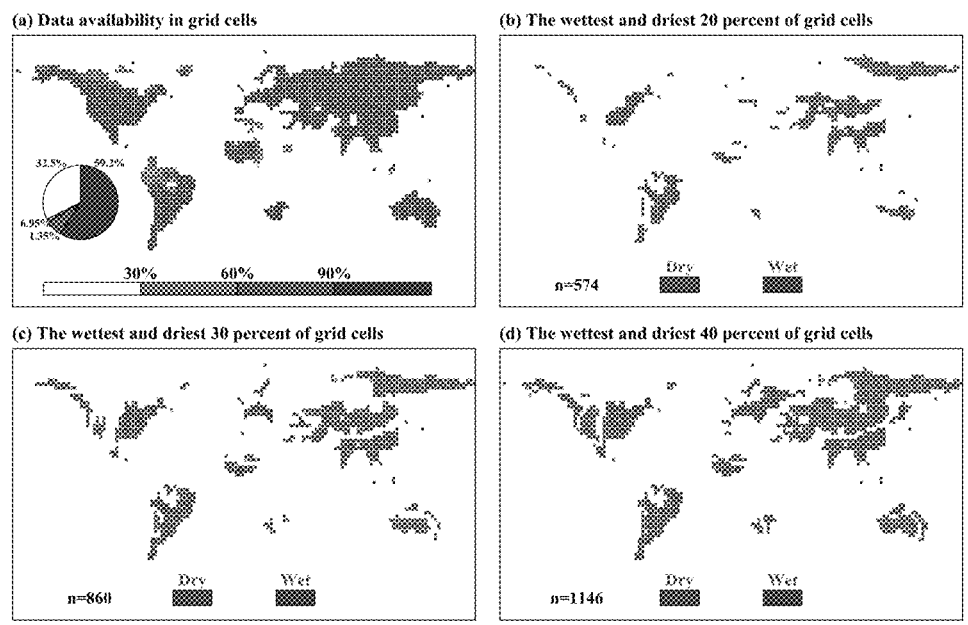
FIG. 2 schematically illustrates identification on an availability of an annual PRCPTOT during the climatological period and division on dry regions and wet regions.

In the example, three observed precipitation datasets (HadEX3, CRU and GPCC) are used. With the method in the step S2, changes in annual PRCPTOT during 1961-2018 are quantified. HadEX3 provides global terrestrial gridded data in the climatological period (1981-2010). In the example, a total of 1432 grid cells with a data availability greater than 90% (covering 59.2% of global terrestrial grid cells) are selected as a study region (FIG. 2a). As shown in FIG. 2, dry regions are primarily located in western Australia, and central and north-eastern Asia. Wet regions are located in southeastern Southern America, eastern North America, western and northern Europe, south-eastern Asia, and western Africa (FIG. 2c). 20% and 40% are used for sensitivity analysis. Results of dry regions and wet regions are not sensitive.

(3) Precipitation Increasing Characteristic in Dry Regions and Wet Regions

Figure 3:
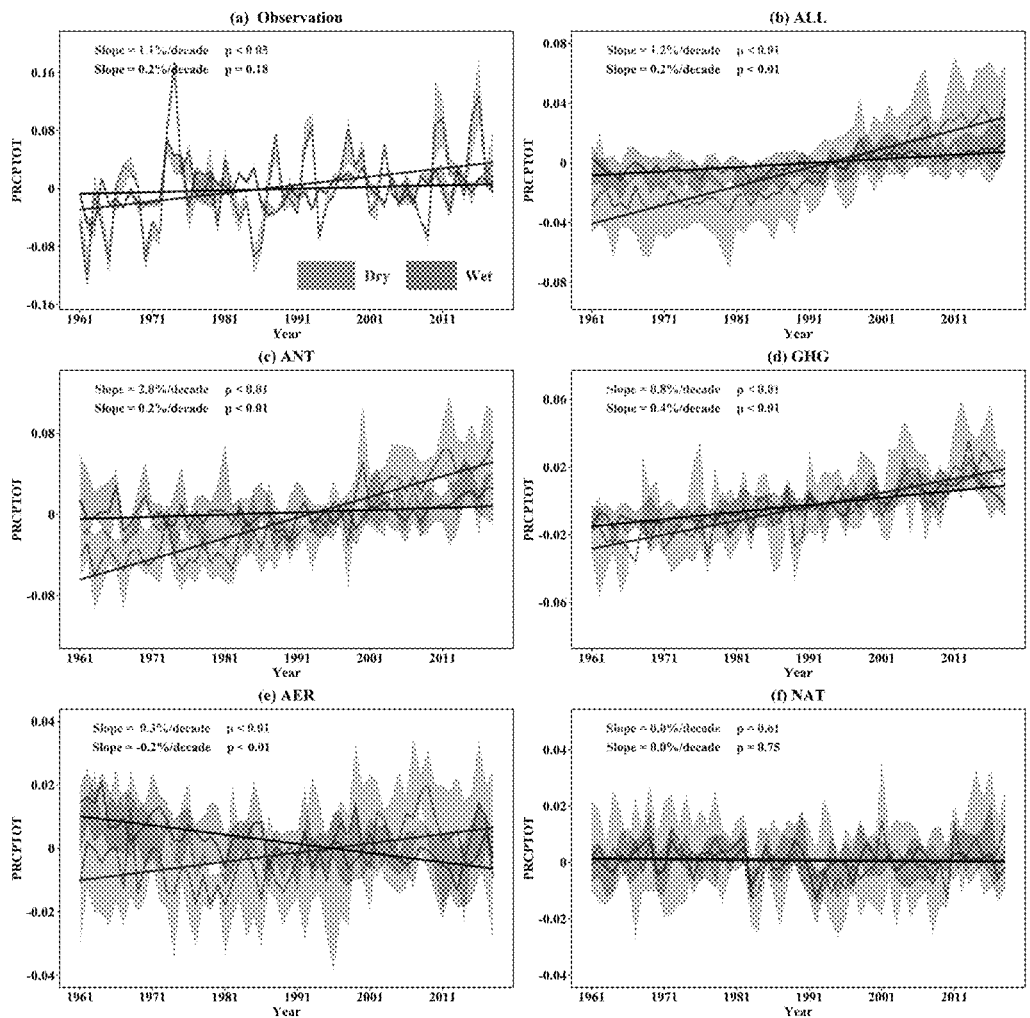
FIG. 3 illustrates a PRCPTOT change of dry regions and wet regions under different historical climate scenarios in observations and simulations.

As shown in FIG. 3, the method in the step S3 is used. In the example, all three observed datasets show increasing annual PRCPTOT during 1961-2018 over dry regions and wet regions, at rates of 1.1% of per decade and 0.2% per decade (FIG. 3a). The increasing rate of observed annual PRCPTOT is five times faster in dry regions compared to wet regions. The CMIP6 simulations under the ALL also reveal increasing rates in dry regions (1.2% decade-1) and wet regions (0.2% decade-1) during 1961-2018 (FIG. 3b). The NAT shows no significant changes in annual PRCPTOT in either region (FIG. 3f). Under ANT, there exist significant increases in annual PRCPTOT over both dry regions (2.0% decade-1) and wet regions (0.2% decade-1), but the difference in increasing rates between the two regions is substantially enlarged (FIG. 3c). Consistent and significant increases in annual PRCPTOT are found in dry regions under both GHG and AER (FIG. 3d-e). However, annual PRCPTOT exhibits a significant decrease under AER over wet regions.

Figure 4:
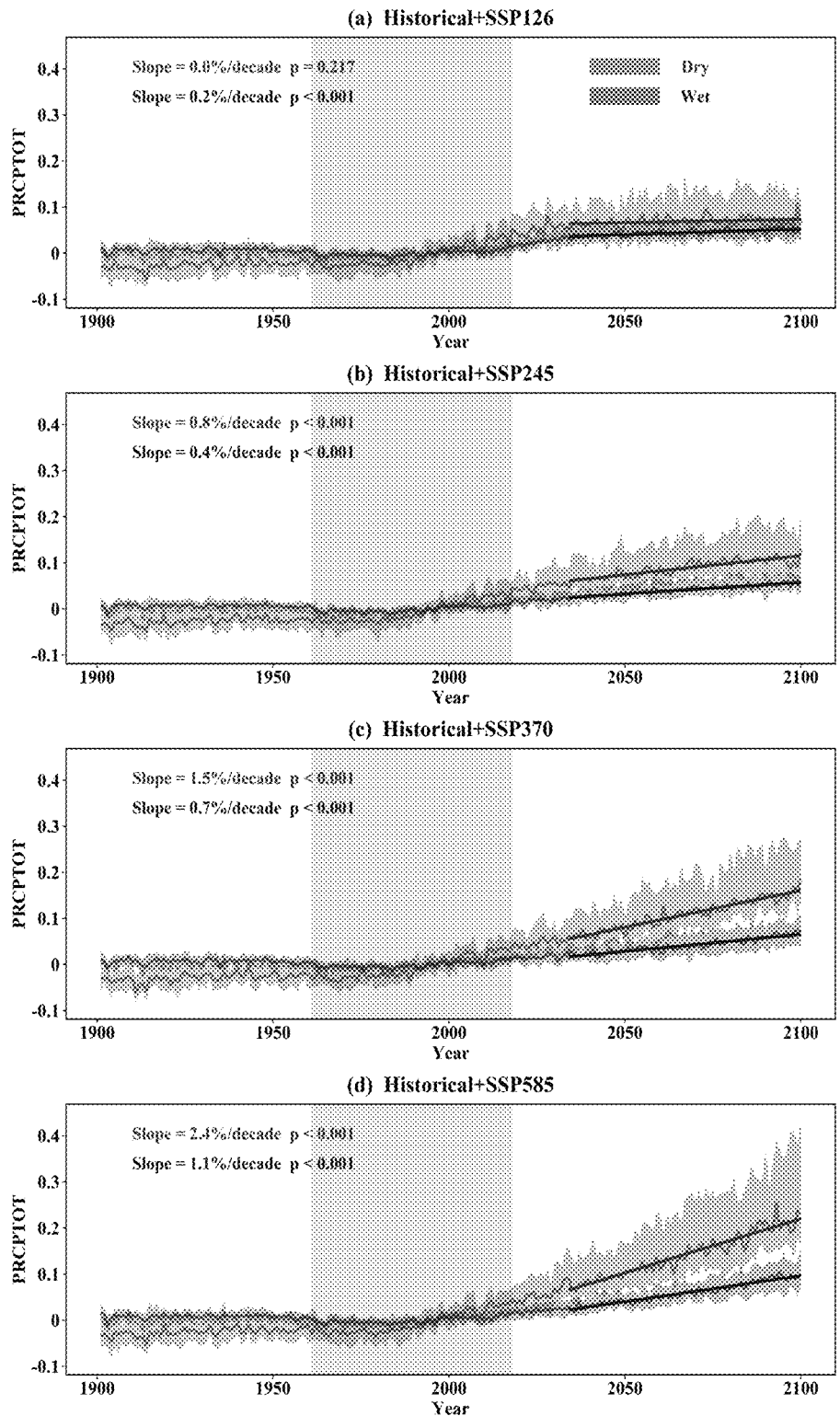
FIG. 4 illustrates a PRCPTOT change of dry regions and wet regions under different future Shared Socio-economic Pathway (SSP) scenarios based on simulations.

As shown in FIG. 4, under the lowest greenhouse-gas emissions, projected increases in annual PRCPTOT are weak in both dry and wet regions during 2043-2100, and this weak growth is more evident in dry regions compared to wet regions. However, significant increases in annual PRCPTOT are projected over both dry and wet regions, as well as a faster increase in dry regions, under the medium greenhouse-gas emissions. As the emissions reach the highest, not only the PRCPTOT increasing rates in dry and wet regions are rising, but also the difference between the two regions is also maximized.

(4) PRCPTOT and Moisture in Response to Warming in Dry Regions and Wet Regions

Figure 5:
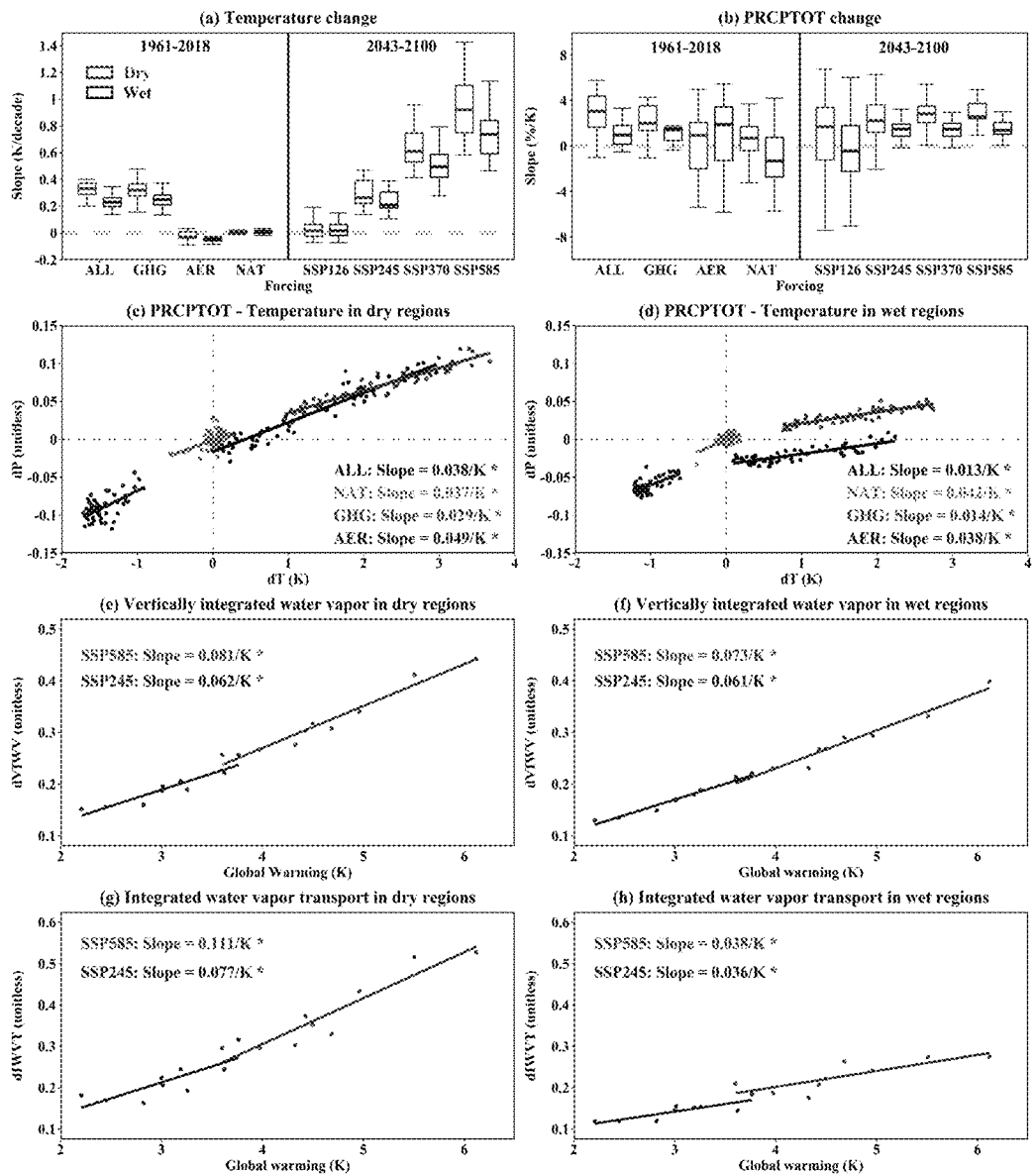
FIG. 5 illustrates PRCPTOT and water vapor changes in dry regions and wet regions in response to warming.

As shown in FIG. 5, with the method in the step S4, a relationship between the annual PRCPTOT and the temperature under different external forcings is analyzed (FIG. 5a-d). During 1961-2018 under ALL, the regional warming rate is faster in dry regions (0.33 K·decade$^{-1}$) than wet regions (0.23 K·decade$^{-1}$) (FIG. 5a). Under ANT, dry regions have the faster warming rate than wet regions. There are stronger warming effects in dry regions under GHG and stronger cooling effects in wet regions under AER. During 2043-2100, the higher the greenhouse-gas emissions, the greater the difference in warming rates that can be expected between dry regions and wet regions. Annual PRCPTOT increases in both dry regions and wet regions with regional warming under ALL, but it increases much faster in dry regions (3.07% K$^{-1}$) compared to the wet (0.98% K$^{-1}$) region (FIG. 2b). Under NAT, the response of annual PRCPTOT to regional warming is weakly positive in dry regions, and is negative in wet regions. Under GHG, dry regions have the faster response rate than wet regions. Under AER, wet regions also have a higher sensitivity of annual PRCPTOT to the cooling effects of aerosols compared with dry regions. As greenhouse-gas emissions grow in the future, the response of annual PRCPTOT to warming is larger in both wet regions and dry regions, with a smaller spread among models, but this response is more sensitive in dry regions.

To evaluate the plausibility of the difference in annual PRCPTOT responses to warming between dry regions and wet regions found in models, CanESM5 experiments are used in the example for analysis. 50 ensembles are used under different external forcings (FIG. 5c-d). The changes in annual PRCPTOT and temperature in both regions are computed by taking the annual anomalies during 1961-2018 (historical period) relative to the 1861-1900 (early industrial period) mean. The regional warming rate and the annual PRCPTOT response rate under different external forcings are consistent between the individual model and the large single-model ensemble. In both regions under ALL and GHG, the precipitation and the temperature show a positive association some distance away from the coordinate origin, while under NAT, both the precipitation and the temperature fluctuate around the climatology of the early industrial revolution.

In the example, with the method in the step S5, a relationship between moisture and global warming in dry regions and wet regions are explored using multiple models under the ALL (1961-1990) and future scenarios (2070-2099) (FIG. 5e-h). Both moisture content and moisture transport show a linear positive association with global warming in dry regions and wet regions. Under medium/highest greenhouse-gas emissions, moisture content is projected to increase by 6.2%/8.1% per unit of global warming in dry regions, and these percentages are very similar with those in wet regions (6.1%/7.3%). The moisture transport is projected to be much stronger in dry regions (7.7%/11.1% per unit warming) than in wet regions (3.6%/3.8% per unit warming).

Figure 6:
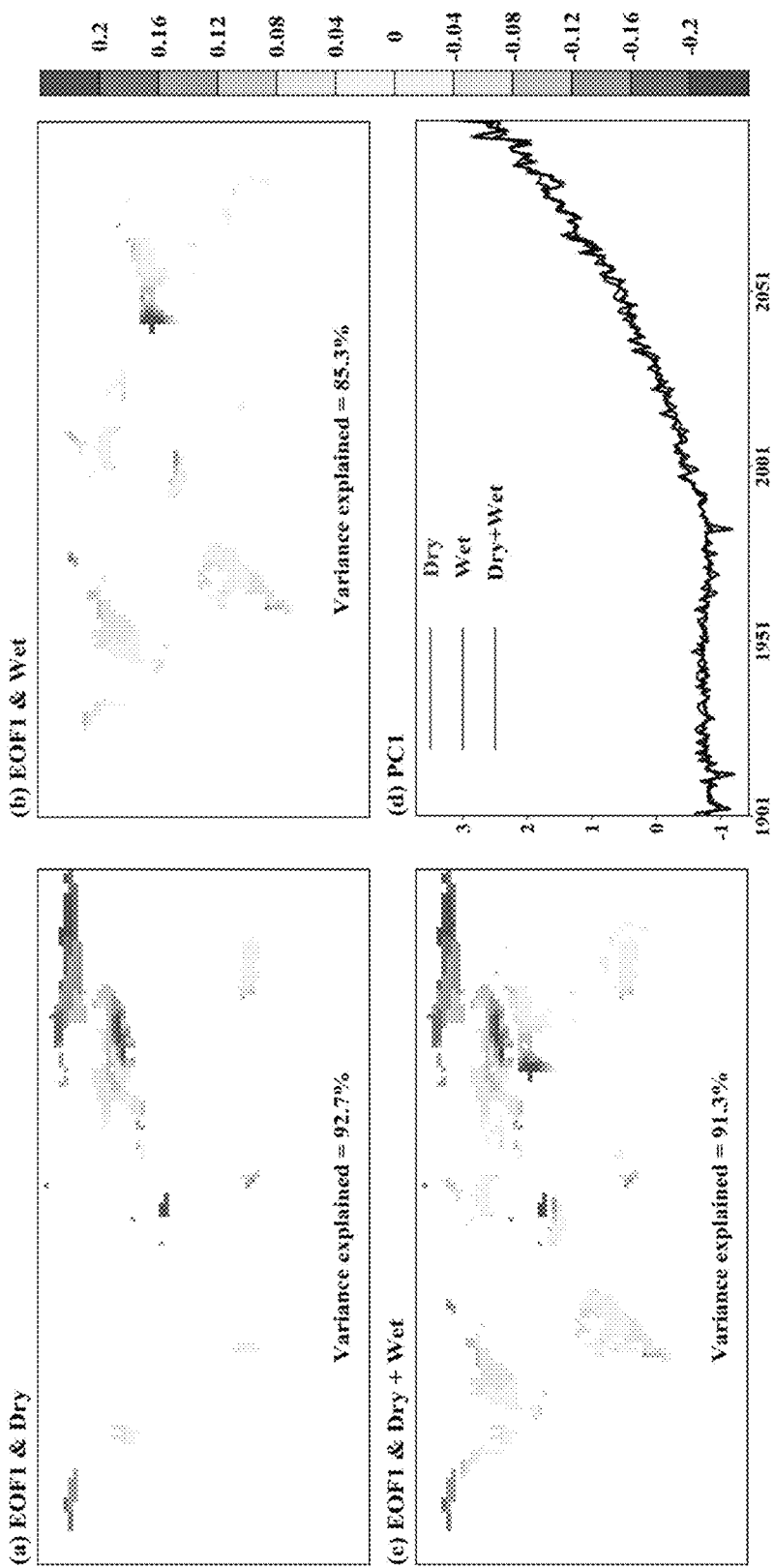
FIG. 6 illustrates a distribution of a first spatial pattern obtained by rotated empirical orthogonal function (REOF) decomposition.

(5) Anthropogenic Climate Change Signal Identification Based on REOF Decomposition As shown in FIG. 6, with the method in the step S6, based on the REOF, leading modes and corresponding temporal principal components (PC) are extracted from the annual PRCPTOT under ALL and future highest emission scenarios during 1901-2100. The leading modes explain between 84.6%-92.7% of the total variance of annual PRCPTOT in dry regions, wet regions, and dry+wet regions, suggesting that they capture most of the original PRCPTOT signal. The changes in PC are highly consistent with the long-term changes in global mean temperature, indicating that the fingerprint is a signal of global warming. These positive responses to global warming are found in about 90% of dry regions and about 70% of wet regions in the spatial patterns.

Figure 7:
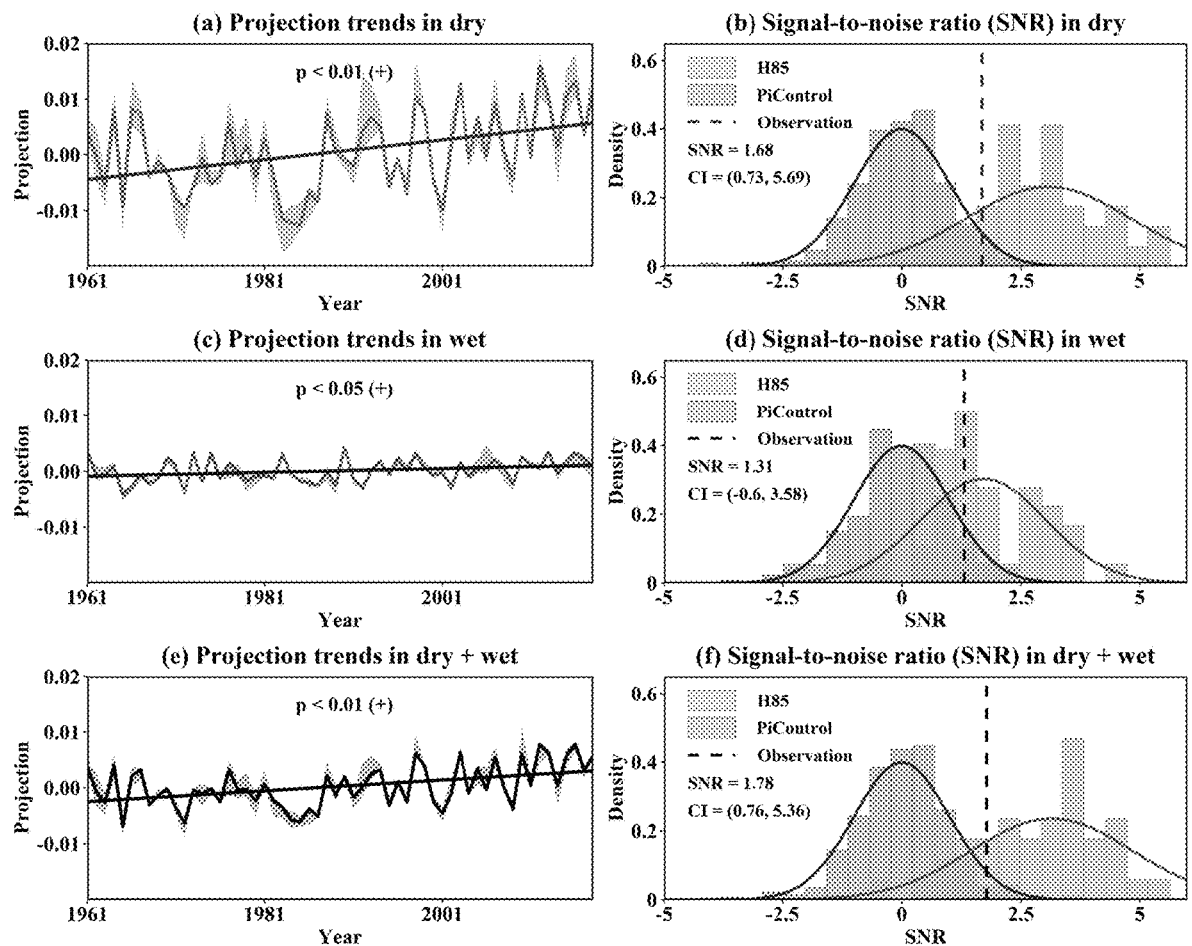
FIG. 7 schematically illustrates an anthropogenic climate change signal and a significance in dry regions and wet regions based on REOF decomposition.

With the method in the step S6, observed and simulated annual PRCPTOT is projected onto the model-based fingerprints in dry regions and wet regions. During the period 1961-2018, observation data in dry regions and wet regions exhibit an increasing resemblance to the fingerprint, as illustrated by the positive trend of fingerprint projections. The SNR analysis reveals that the anthropogenic climate change signal during 1961-2018 is detectable with 90% confidence in dry+wet regions (SNR=1.73; FIG. 7f). In comparison with dry+wet regions, a consistent increasing resemblance to the fingerprint can be seen in dry region where the anthropogenic climate change signal is also detectable (SNR=1.68; FIG. 7a, b). Despite the presence of a positive trend in the fingerprint projections, the anthropogenic climate change signal fails to be detected in wet regions (SNR=1.31; FIG. 7c, d).

Figure 8:
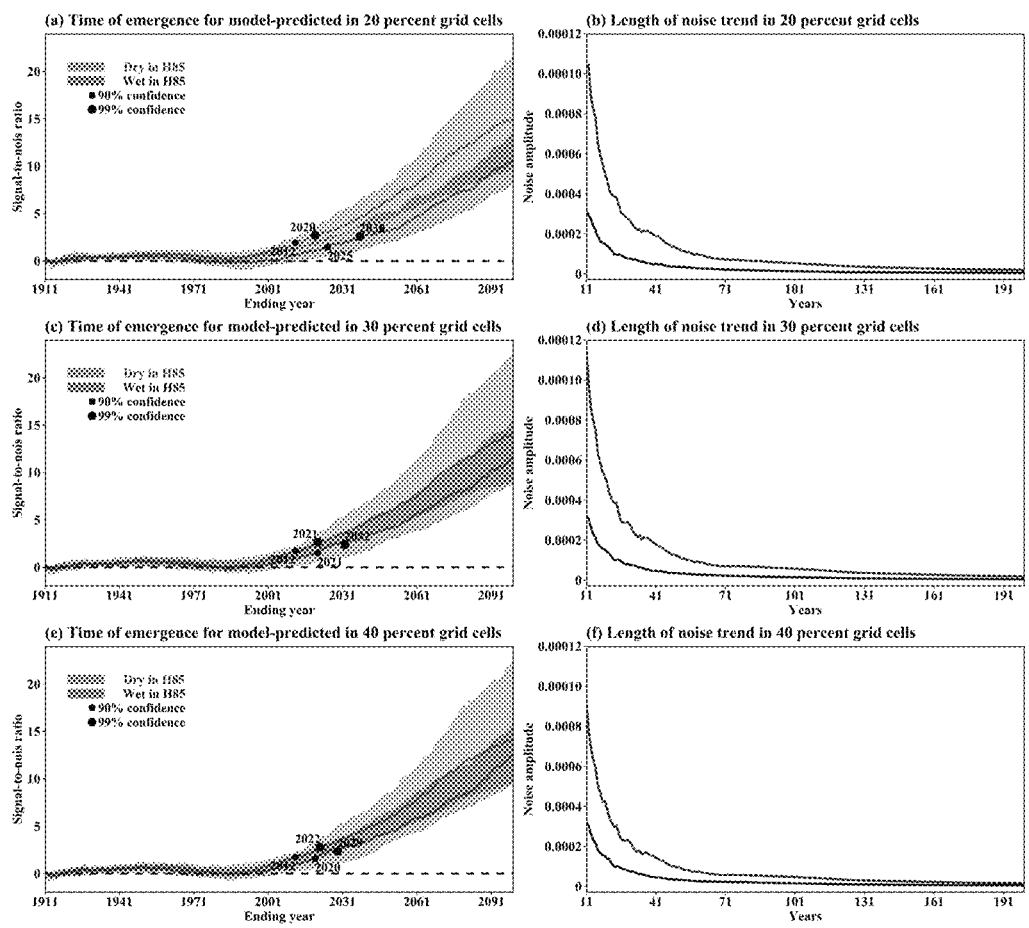
FIG. 8 illustrates a change on time of emergence of an anthropogenic climate change signal and a noise trend in dry regions and wet regions.

As shown in FIG. 8, both dry regions and wet regions show increasing trends in the SNR under the future highest emission scenario, but a faster increase in SNR is found in dry regions. The anthropogenic climate change signal becomes significantly detectable in simulated annual PRCPTOT in dry regions in 2012 and 2021 at the 90% and 99% confidence levels, respectively, supporting the presence of a detectable anthropogenic climate change signal in annual PRCPTOT observations in FIG. 7a-b. In wet regions, however, an ACC signal only becomes detectable by the years 2021 and 2032. In dry regions and wet regions, the noise amplitude is reduced quickly with longer trend-fitting periods (FIG. 8b, d, and f). The noise amplitude and SNR are larger in dry regions than in wet regions, suggesting that the historical anthropogenic climate change signal is more pronounced in dry regions.

Figure 9:
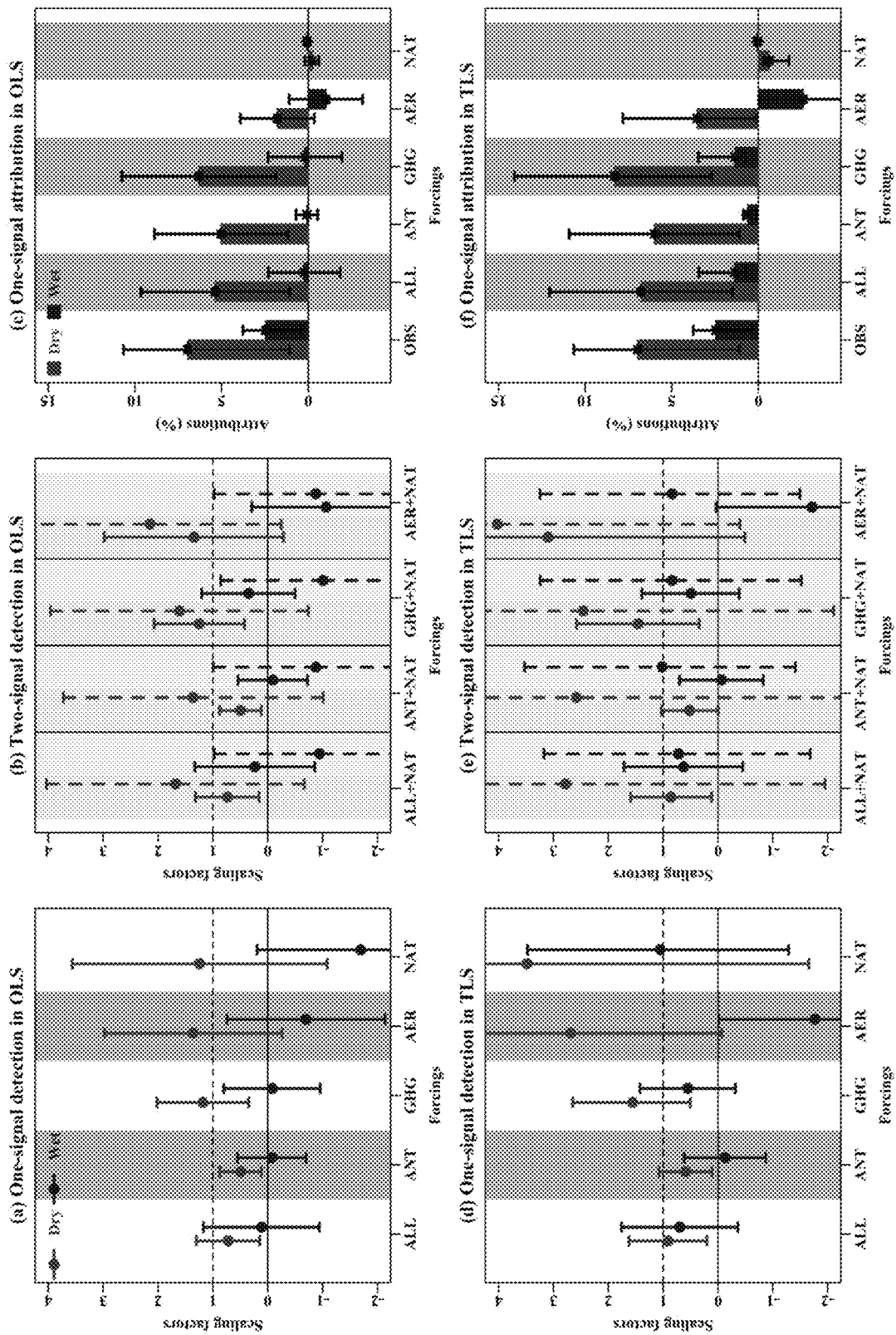
FIG. 9 schematically illustrates detection on an anthropogenic climate change signal and attribution of an external forcing based on an optimal fingerprinting method in dry regions and wet regions.

(6) Anthropogenic Climate Change Signal Identification Based on an Optimal Fingerprinting Method As shown in FIG. 9, with the method in the step S7, detection and attribution results from the REOF-based method are validated with the optimal fingerprinting method, and contributions of external forcings to observed changes in annual PRCPTOT during 1961-2018 are quantified. In dry regions, both the ordinary least squares (OLS) and total least squares (TLS) estimated scaling factors of simulated annual PRCPTOT are significantly above zero under the ALL, ANT, and GHG simulations based on the one-signal analyses. However, this is not the case under the NAT or AER simulation (FIGS. 9a and d). For the simulated annual PRCPTOT in wet regions, there is no scaling factor significantly greater than zero. The one-signal analysis results are also supported by two-signal analyses, which also show that the annual PRCPTOT responses for the ALL, ANT, and GHG simulations are distinct from those under NAT in dry regions but not in wet regions (FIG. 9b, e).

According to the equation for quantifying contributions of external forcings in the step S7, the contributions of external forcings to observed changes in annual PRCPTOT are estimated. From 1961-2018, observed annual PRCPTOT has increased by 5.63-7.39% (2.44-2.80%) in dry (wet) region based on thresholds of 20-40% to identify the dry/wet region. The increases in annual PRCPTOT in dry (wet) region attributed to ALL, ANT, and GHG are 5.22-5.82% (0.06-1.67%), 5.02-6.17% (−0.46-0.21%), and 5.68-8.20% (0.19-1.18%), respectively, based on the OLS estimation. The proportions estimated from TLS are 6.25-7.04% (0.94-2.08%), 5.89-7.07% (−0.56-0.91%), and 6.96-9.93% (1.18-2.14%), respectively. The increases in annual PRCPTOT that are detected in the ALL simulations are comparable to the observed increases found in dry regions but exceed the changes found in wet regions. These findings support the robustness of the attribution results in dry regions.

Figure 10:
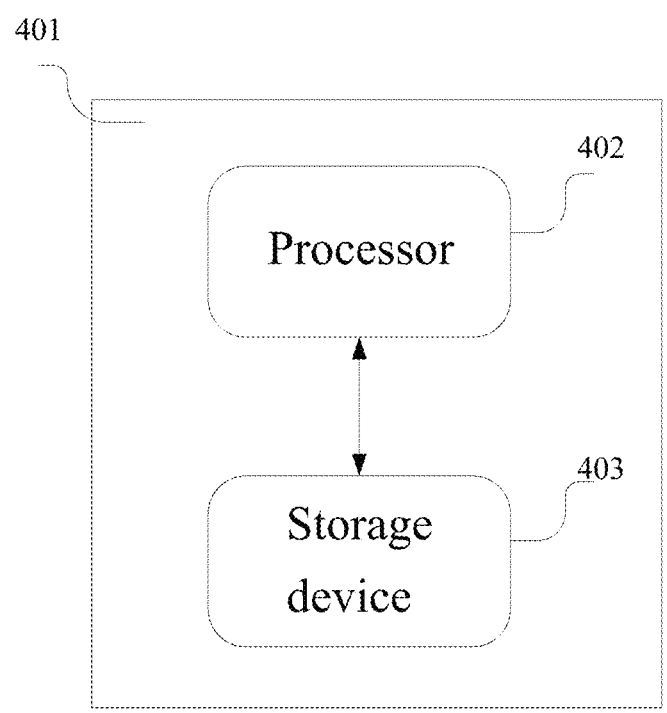
FIG. 10 schematically illustrates working of a hardware device according to the present disclosure.

FIG. 10 illustrates working of a hardware device according to an embodiment of the present disclosure. Referring to FIG. 10, the hardware device specifically includes an intensification mechanism analysis and anthropogenic climate change signal identification device for TWC in dry and wet regions 401, a processor 402 and a storage device 403

The intensification mechanism analysis and anthropogenic climate change signal identification device for TWC in dry and wet regions 401 realizes the intensification mechanism analysis and anthropogenic climate change signal identification method for TWC in dry and wet regions.

The processor 402 loads and executes an instruction and data in the storage device 403 to realize the intensification mechanism analysis and anthropogenic climate change signal identification method for TWC in dry and wet regions.

The storage device 403 stores the instruction and the data. The storage device 403 is configured to realize the intensification mechanism analysis and anthropogenic climate change signal identification method for TWC in dry and wet regions.

The present disclosure has following beneficial effects:

(1) The present disclosure provides a method for identifying dry regions and wet regions. This facilitates in-depth understanding of academic circles on different climate regions. The present quantifies the precipitation increasing rate in dry regions and wet regions under the observed data, simulates different climate scenarios and estimates different greenhouse-gas emission scenarios, thereby providing a scientific basis for disaster control policies and measures in dry and wet regions.

(2) The present disclosure quantifies the regional warming rate in dry regions and wet regions, and clarifies a sensitivity of precipitation to regional warming in dry and wet regions. By analyzing water vapor conditions in dry regions and wet regions, the present disclosure clarifies different warming responses of the dry and wet regions to the global warming from the VIWV and the IWVT. This provides a theoretical support for decision makers to formulate climate change countermeasures for TWC in dry and wet regions.

(3) The present disclosure quantitatively detects an observed precipitation change in dry regions and wet regions, identifies impacts of ACC on the precipitation in dry and wet regions under different external forcings, and quantifies contributions of different external forcings to the precipitation change, thereby providing a theoretical support for attribution of the TWC worldwide.

The above are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. An intensification mechanism analysis and anthropogenic climate change signal identification method for a terrestrial water cycle (TWC) in dry and wet regions, comprising the following steps:

S1, acquiring climatic data, the climatic data comprising global gridded precipitation observation data, and simulated data in coupled model intercomparison project phase 6 (CMIP6) simulations, and the simulated data comprising precipitation data, near-surface air temperature data, meridional wind velocity data, zonal wind velocity data, specific humidity data and surface air pressure data;

S2, calculating annual total precipitations (PRCPTOTs) across a global land surface according to the precipitation observation data, calculating an average annual PRCPTOT during a climatological period, and selecting top a % of grid cells as wet regions, and bottom a % of grid cells as dry regions, a being a preset value;

S3, calculating an annual PRCPTOT in the dry regions and an annual PRCPTOT in the wet regions according to the precipitation observation data, the grid cells in the wet regions and the grid cells in the dry regions; and calculating an average annual PRCPTOT in the dry regions and the wet regions during the climatological period, performing normalization and regional averaging to obtain a normalized annual PRCPTOT, and quantifying a temporal trend of the normalized annual PRCPTOT in the dry regions and the wet regions to obtain a precipitation increasing rate in the dry regions and the wet regions;

S4, calculating, according to the precipitation observation data and the near-surface air temperature data in the CMIP6 simulations, a weighted-area-averaged annual air temperature anomaly in the dry regions and a weighted-area-averaged annual air temperature anomaly in the wet regions, and quantifying a temporal trend of the air temperature anomaly in the dry regions and the wet regions to obtain a regional warming rate in the dry regions and the wet regions; and comparing the precipitation increasing rate in the dry regions and the wet regions obtained in the step S3 with the regional warming rate in the dry regions and the wet regions to obtain a precipitation response warming rate in the dry regions and the wet regions;

S5, calculating, according to the simulated data in the CMIP6 simulations, a weighted-area-averaged normalized vertically integrated water vapor (VIWV) and a weighted-area-averaged normalized vertically integrated water vapor transport (IWVT) in the dry regions and the wet regions in a historical period and a future period, and calculating a projected change of the future period compared with the historical period to obtain a VIWV increasing rate and an IWVT increasing rate in the dry regions and the wet regions in response to global warming;

S6, performing, in combination with the normalized annual PRCPTOT in the step S3, rotated empirical orthogonal function (REOF) decomposition on three-dimensional (3D) spatio-temporal data of the annual PRCPTOT for the grid cells of the dry regions and 3D spatio-temporal data of the annual PRCPTOT for the grid cells of the wet regions to obtain a fingerprint pattern, projecting the fingerprint pattern to an observed and simulated annual PRCPTOT of the dry regions and the wet regions, and quantifying a signal-to-noise ratio (SNR) to calculate a significance of an anthropogenic climate change signal in the dry regions and the wet regions, wherein the step S6 specifically comprises:

S61, selecting 3D spatio-temporal data of the normalized annual PRCPTOT in the dry regions and the wet regions from a historical climate forcing (ALL) and future different Shared Socio-economic Pathway (SSP) simulations in the CMIP6, performing the REOF decomposition to obtain a spatial fingerprint pattern of a leading mode, and projecting the spatial fingerprint pattern to an observed annual PRCPTOT and a pre-industrial simulated annual PRCPTOT in the dry regions and the wet regions, with a projection being calculated by:

$$\text{Projection }(t) = \frac{\sum_{i\in lon_S, j\in lat_S} F(i,j) A(i,j) PRCP(i,j,t)}{\sum_{i\in lon_S, j\in lat_S} A(i,j)}$$

wherein, t represents a year, i represents a longitude of the grid cell, j represents a latitude of the grid cell, A represents an area of the grid cell, S represents the dry regions or the wet regions, PRCP represents the annual PRCPTOT, F represents the spatial fingerprint pattern, and $lon_s$ and $lat_s$ respectively represent a longitude set and a latitude set;

S62, calculating a trend with the projection, calculating the SNR with an l-year trend projected by observed data and CMIP6 historical simulated annual PRCPTOT in the dry regions and the wet regions as a signal, and a standard deviation of an l-year trend projected by the CMIP6 pre-industrial simulated annual PRCPTOT as a noise, and dividing the significance of the signal according to the SNR, l being a preset value; and S63, calculating, from a m-year length to a n-year length, a projection trend for the CMIP6 historical simulated annual PRCPTOT and the CMIP6 pre-industrial simulated annual PRCPTOT in the dry regions and the wet regions, calculating time of emergence of the anthropogenic climate change signal according to the SNR, and validating a robustness of the anthropogenic climate change signal in an observed precipitation of the dry regions and the wet regions according to a model result, m and n being a preset value; and S7, performing, in combination with the precipitation data of the CMIP6 simulations obtained in the step S1, detection and attribution on an external forcing with a single-signal optimal fingerprinting method and a two-signal optimal fingerprinting method.

2. The intensification mechanism analysis and anthropogenic climate change signal identification method for the TWC in the dry and wet regions according to claim 1, wherein in the step S1, the global gridded precipitation observation data or the precipitation data in the CMIP6 simulations is data obtained by ensemble averaging on multiple sets or pieces of precipitation data in different models.

3. The intensification mechanism analysis and anthropogenic climate change signal identification method for TWC in the dry and wet regions according to claim 1, wherein in the step S2, the annual PRCPTOTs are calculated with a monthly precipitation or a daily precipitation; the average annual PRCPTOT is calculated according to the climatological period; average annual PRCPTOTs during the climatological period across grid cells of the global land surface are sorted; top 30% of grid cells are selected as the wet regions, and bottom 30% of grid cells are selected as the dry regions.

4. The intensification mechanism analysis and anthropogenic climate change signal identification method for the TWC in the dry and wet regions according to claim 1, wherein the step S3 specifically comprises:

S31, selecting multiple sets of observed precipitation data from different models in different scenarios of the CMIP6, comprising the ALL, a greenhouse-gas forcing (GHG), an anthropogenic-aerosol forcing (AER), a natural forcing (NAT) and four future different SSP scenarios; and S32, calculating the average annual PRCPTOT during the climatological period, calculating a ratio of a difference between the annual PRCPTOT and the average annual PRCPTOT to the average annual PRCPTOT to obtain the normalized annual PRCPTOT, performing area-weighted averaging on the normalized annual PRCPTOT and the corresponding grid cells of the dry regions and the wet regions to obtain a weighted-area-averaged normalized annual PRCPTOT in the dry regions and the wet regions, quantifying the temporal trend of the normalized annual PRCPTOT in the dry regions and the wet regions to obtain the precipitation increasing rate in the dry regions and wet regions.

5. The intensification mechanism analysis and anthropogenic climate change signal identification method for TWC in the dry and wet regions according to claim 1, wherein the step S4 specifically comprises:
S41, selecting the near-surface air temperature data from different scenarios in the CMIP6 simulations, comprising ALL, GHG, AER, NAT and four future different SSP scenarios; and
S42, calculating an annual air temperature in the dry regions and an annual air temperature in the wet regions, calculating a climatological annual air temperature, quantifying a difference between the annual air temperature and the climatological annual air temperature to obtain the annual air temperature anomaly, performing weighted averaging on the annual air temperature anomaly and the corresponding grid cells of the dry regions and the wet regions to obtain a regionally averaged annual air temperature anomaly in the dry regions and wet regions, quantifying a trend to obtain a regional warming trend in the dry regions and wet regions, comparing the precipitation increasing rate with the regional warming rate to obtain the precipitation response warming rate in the dry regions and wet regions.

6. The intensification mechanism analysis and anthropogenic climate change signal identification method for the TWC in the dry and wet regions according to claim 1, wherein the step S5 specifically comprises:
S51, selecting data from the ALL and future different SSP scenarios based on CMIP6, calculating the VIWV, the IWVT and a globally averaged annual air temperature, wherein the VIWV and the IWVT are respectively calculated by:

$$VIWV = \frac{1}{\rho g} \int_{p_t}^{p_s} q\, dp$$

$$IWVT = \frac{1}{\rho g} \int_{p_t}^{p_s} \sqrt{(uq)^2 + (vq)^2}\, dp$$

wherein, $\rho$ represents a water density, g represents a gravitational acceleration, $p_t$ represents a pressure at a top of an atmosphere, $p_s$ represents a near-surface pressure, q represents a specific humidity, v represents a meridional wind, and u represents a zonal wind; and
S52, normalizing the VIWV and the IWVT same as the annual PRCPTOT, and calculating, in combination with the globally averaged annual air temperature, the VIWV and the IWVT of the dry regions and wet regions during the historical period and at an end of a twenty-first century in response to global warming.

7. The intensification mechanism analysis and anthropogenic climate change signal identification method for the TWC in the dry and wet regions according to claim 1, wherein the optimal fingerprinting method in the step S7 is given by:

$$y = (X - \alpha)\beta + \epsilon$$

wherein, y represents an observed annual PRCPTOT time series of the dry regions and wet regions, X represents a simulated annual PRCPTOT time series of the dry regions and wet regions, comprising ALL, GHG, AER and NAT, $\beta$ represents a scaling factor, and $\epsilon$ represents a regression residual; and the external forcing attributed by an observed change of the annual PRCPTOT in the dry regions and wet regions is quantified as:

$$Con = Slope \times \beta$$

wherein, slope represents a simulated linear trend for the annual PRCPTOT in the dry regions and wet regions under each external forcing.

8. A storage device, wherein the storage device stores an instruction and data for realizing the intensification mechanism analysis and anthropogenic climate change signal identification method for a terrestrial water cycle (TWC) in dry and wet regions according to claim 1.

9. An intensification mechanism analysis and anthropogenic climate change signal identification device for a terrestrial water cycle (TWC) in dry and wet regions, comprising a processor and a storage device, wherein the processor loads and executes an instruction and data in the storage device to realize the intensification mechanism analysis and anthropogenic climate change signal identification method for the TWC in the dry and wet regions according to claim 1.

\* \* \* \* \*